United States Patent

Endter

[15] 3,638,702
[45] Feb. 1, 1972

[54] TIRE TREAD COMPOSITIONS

[72] Inventor: Norman G. Endter, Cuyahoga Falls, Ohio

[73] Assignee: The Goodyear Tire & Rubber Company, Akron, Ohio

[22] Filed: Feb. 23, 1968

[21] Appl. No.: 707,487

[52] U.S. Cl. ................................152/330, 260/3, 260/5, 260/38, 260/39 R, 260/41.5, 260/839, 260/845, 260/846, 260/852
[51] Int. Cl. ........................................B60c 11/00, C08g 51/08
[58] Field of Search ..................260/3, 5, 845, 839, 846, 852, 260/41.5 R, 38, 39 R; 152/330

[56] References Cited

UNITED STATES PATENTS

| | | | |
|---|---|---|---|
| 3,507,689 | 4/1970 | Freytag et al. | 260/852 |
| 3,517,722 | 6/1970 | Endter et al. | 260/852 |
| 3,518,155 | 6/1970 | Freytag et al. | 260/852 |
| 3,060,989 | 10/1962 | Railsback et al. | 260/5 |
| 3,294,714 | 12/1966 | Peterson et al. | 260/5 |
| 3,310,508 | 3/1967 | Roy | 260/5 |
| 3,312,643 | 4/1967 | Ball | 260/3 |
| 3,366,583 | 1/1968 | Wilson | 260/3 |

*Primary Examiner*—John C. Bleutge
*Attorney*—F. W. Brunner and J. A. Rozmajzl

[57] ABSTRACT

Vehicle tires possessing a tread composition containing rubbery polymers, a methylene acceptor, a methylene donor and a low level of sulfur.

10 Claims, No Drawings

TIRE TREAD COMPOSITIONS

This invention relates to pneumatic tire tread vulcanizable compositions containing a methylene donor and a methylene acceptor, together with a low level of sulfur, and to a tire the tread of which is made of the composition resulting in a tire having improved resistance to chipping, rib tearing and tread cracking. This improvement is particularly noticeable in truck tires and off the road tires.

It is known that tire treads, particularly truck tire treads and off the road tire treads, are subject to chipping, tread cracking and rib tearing. During the operation of a tire, great quantities of heat are generated. Truck tire treads and off the road tire treads are particularly thick, especially in the shoulder area. Due to the tread thickness, the heat generated during the operation of the tire is not readily dissipated. This can result in heat buildup which in turn causes accelerated rib tearing, chipping and/or tread cracking. As a result it is desirable that the tread contain an elastomeric composition which has a tendency to reduce heat buildup during the operation of the tire. In the past, natural rubber and/or synthetic polyisoprene possessing a high cis-1,4 configuration has been used because of its low heat buildup properties.

It has long been desired for economic and other reasons to be able to replace in whole or in part the natural rubber and/or synthetic polyisoprene with synthetic rubber compositions such as cis-1,4 polybutadiene and elastomeric butadiene/styrene copolymers in such applications either alone or in combination with one another. In particular it has been desired to use cis-1,4 polybutadiene in combination with natural rubber and/or synthetic polyisoprene to improve tread wear resistance. However, the use of such synthetic polymers and blends thereof with one another or with natural rubber and/or synthetic polyisoprene generally results in excessive chipping, tread cracking and rib tearing. It has long been a desire to use such rubbery materials in tire tread applications without sacrificing resistance to excessive chipping, tread cracking and rib tearing. In addition, it has been desired to improve the tread wear and/or resistance to chipping, tread cracking and rib tearing of tread compositions made from natural rubber and/or synthetic polyisoprene rubber.

It is an object of this invention to provide a vulcanizable tire tread composition comprising cis-1,4 polybutadiene, an elastomeric butadiene/styrene copolymer, natural rubber and/or a synthetic cis-1,4 polyisoprene which possesses excellent tread wear and exceptional resistance to chipping, tread cracking and rib tearing.

The objects of the present invention are accomplished by the use of a vulcanizable rubbery composition comprising cis-1,4 polybutadiene, an elastomeric butadiene/styrene copolymer, natural rubber and a synthetic cis-1,4 polyisoprene either alone or in combination, said composition containing a methylene donor and a methylene acceptor together with a low level of sulfur.

Examples of the methylene donors that may be used in the tread composition of this invention contain at least one three-valent nitrogen connected to at least one $CH_2$ radical. The remaining valence of the $CH_2$ radical is connected either to the same nitrogen to form a methyleneamino radical ($-N = CH_2$) or the remaining valence of the $CH_2$ radical is connected to an oxy radical ($-OX$) wherein X is a radical selected from the group consisting of hydrogen to form a methylol group ($-CH_2OH$), or a lower alkyl (1–8C) to form an alkoxymethyl group ($-CH_2OR$), or methylene ($-CH_2-$). The methylene ($-CH_2-$) radical may in turn be connected to other radicals in forming the desired compound that may be used as a methylene donor of this invention. When one of the nitrogen valences are satisfied by the $CH_2$ radical at least one of the two remaining valences of the nitrogen is connected to a carbon atom and the remaining valence may be connected to a carbon atom or hydrogen. When the two remaining valences are each connected to a separate carbon atom each in a separate radical they will form together with the nitrogen mentioned above and the $CH_2$ radical an N-(substituted oxymethyl) amide, or an N-(substituted oxymethyl) cyclicimide, or a 5-substituted-1-aza-3,7-dioxabicyclo [3.3.0] octane, or a 5-substituted-1,3-di(substituted oxymethyl) hexahydrotriazin-2-one, N-(substituted oxymethyl) derivatives of urea, including N-(substituted oxymethyl) imidazolidines, and N-(substituted oxymethyl) hydantoins, as well as derivatives of N-(substituted oxymethyl) melamines. One class of urea derivatives has the general formula

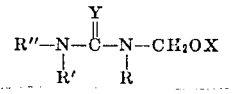

wherein Y is oxygen or sulfur, X is hydrogen or lower alkyl (1–8C) and R, R' and R" are hydrogen, lower alkyl (1–8C) or $-CH_2OX$, but not more than two $-CH_2OX$ groups may be present in the compound, and not more than one $-CH_2OX$ may be present on any one nitrogen atom. Examples of these ureas are 1,3-dimethylol thiourea, 1,3-dimethylol urea, 1,3-dimethylol-1-methyl thiourea, 1,3-dimethylol-1,3-dimethyl urea, 1,3-dimethylol-1,3-dibutyl urea, 1,3-dimethylol-1,3-diisobutyl thiourea, and 1-methylol-1,3,3-trimethyl urea.

Hexamethylenetetraamine and complexes of hexamethylenetetramine, such as a toluene sulfonic acid complex of methylenetetramine may also be used.

The imidazolidines, also known as cyclic ureas, have the general formula:

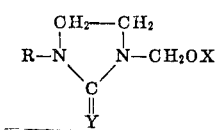

wherein Y is sulfur or oxygen, X is lower alkyl (1–8C) or hydrogen and R is lower alkyl (1–8C), hydrogen, or $-CH_2OX$. Examples of the N-(substituted oxymethyl) imidazolidines are 1,3-dimethylol-2-imidazolidinone, and 1-methylol-3-methyl-2-imidazolidinethione.

The hydantoins, also referred to as cyclic ureides, have the general formula:

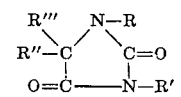

wherein R and R' are lower alkyl (1–8C) hydrogen and at least one being $-CH_2OX$ wherein X is hydrogen or lower alkyl (1–8C) and R" and R''' are lower alkyl (1–8C), or hydrogen. Examples of these hydantoins are 1-methylol-5,5-dimethyl hydantoin, 3-methylol-5,5-dimethylhydantoin, 1,3-dimethylol-5,5-dimethylhydantoin, and 1-methylol-5,5-dibutylhydantoin.

The N-(substituted oxymethyl) melamine derivatives have the general formula:

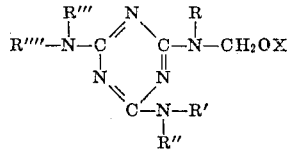

wherein X is hydrogen or lower alkyl (1–8C), R, R', R", R''', and R'''' are lower alkyl (1–8C), hydrogen or $CH_2OX$ wherein X is hydrogen or lower alkyl (1–8C). Examples of these melamines are hexakis (methoxymethyl) melamine, N,N',N"trimethyl-N,N',N"-trimethylolmelamine, hexamethylolmelamine, N,N', N''-trimethylolmelamine, N-methylolmelamine, N,N'-dimethylolmelamine, N,N',N''-triethyl-N,N',N''-tris(methoxymethyl) melamine, and N,N',N''tributyl-N,N',N''-trimethylolmelamine.

The N-methylol derivatives of urea are made by reacting the parent urea with 2 mol equivalents of a 37 percent aqueous formaldehyde solution until the urea has dissolved in the solution during stirring, removing water and recovering the product. The N-methylol derivatives of imidazolidine and of hydantoin are prepared in the same manner described for the urea above with the exception that the parent urea is substituted with the parent imidazolidine and with the parent hydantoin. The N-methlol melamines are prepared by reacting the parent or base melamine with from 1 mol equivalent to 6 mol equivalents of 37 percent aqueous formaldehyde solution with stirring until the melamine has completed its reaction with the formaldehyde as evidenced by solvation of the melamine. Water is removed and the desired product recovered in a conventional manner.

When the nitrogen is connected to a CH₂ radical through a double bond to form an azomethine the remaining nitrogen valence is connected to a carbinyl radical to which each remaining valence is satisfied by carbon or the remaining nitrogen valence may be connected to a methylene group believed to be present when methyleneaminoacetonitrile is trimerized.

Subclasses of methylene donors useful in this invention containing the substituted oxymethyl group (—CH₂OX) are those donors known as the 5-substituted-1-aza-3,7-dioxabicyclo [3.3.0] octanes having the general formula:

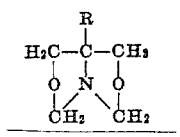

wherein R is a racial selected from the group consisting of hydrogen, lower alkyl (1-8C), and methylol (—CH₂OH). These octanes may be prepared by reacting 2 mols of formaldehyde or para-formaldehyde with 1 mol of a 2-substituted-2-amino-1,3-propanediol. Thus in this type of compound each of two of the valences of the nitrogen is connected to a —CH₂OX grouping wherein X is a methylene group (—CH₂—). The third valence of the nitrogen is connected to a carbon in a radical which together with the N and the (—CH₂O—CH₂—) groups form the 5-substituted-1-aza-3,7-dioxabicyclo [3.3.0] octane, the donated methylene producing radical being the CH₂ groups attached to the nitrogen.

Another subclass of methylene donors containing the substituted oxymethyl radical (—CH₂OX) are the amides wherein one of the valences of the nitrogen is connected to a carbonyl group

from a carboxylic acid which together with the substituted oxymethyl radical may be referred to as a substituted oxymethyl-carboxamido group. The amides of this invention may more specifically be referred to as N-methylolamides of monocarboxylic acids when X is hydrogen. Specific examples of these amides are N-methylolacetamide, N-methylolbutyramide, N-methylolbenzamide. The remaining nitrogen valence may be connected to a lower alkyl radical (1-8C) or a substituted oxymethyl radical (—CH₂OX) where X may be a radical as defined for X above.

When the remaining valence of the nitrogen is connected to a second carbonyl

group, a cyclic imide may be formed. Examples of the N-substituted oxymethyl cyclic imides of dicarboxylic acids useful in this invention where the substituent in hydrogen are N-methylolsuccinimide, N-methylolmaleimide, N-methylolitaconimide, N-methylolcitraconimide, N-methylolphthalimide, N-methylolhexahydrophthalimide, N-methylol-1,2,3,6-tetrahydrophthalimide, and N-methylol 3,6-endomethylene-Δ4-tetrahydrophthalimide. The N-(substituted oxymethyl) amides and the N-(substituted oxymethyl) cyclic imides form in situ resins when heated in the presence of a methylene acceptor.

More specific NCH₂OX types of donors useful in this invention are the 5 substituted 1,3-di(substituted oxymethyl) hexahydro-sym-triazin-2-ones, wherein the 5 substituent may be lower alkyl (1-8C) or cycloalkyl and wherein the substituent of the substituted oxymethyl radical (—CH₂OX) may be hydrogen, methyl and lower alkyl (2-8C). These triazin-2-ones are prepared by reacting a dimethylol urea with a primary amine, such as ethylamine and then reacting the product, triazone, with 2 mols of formaldehyde, under alkaline conditions.

Another class of compounds under the broad class of methylene donors useful in this invention are known as the azomethines having the general formula:

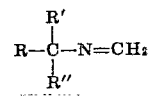

wherein R, R' and R'' are lower alkyl (1-8C) radicals, phenyl, benzyl and 2-phenylethyl. Examples of these donors are t-butylazomethine, t-octylazomethine or neopentyldimethylcarbinylazomethine, alpha, alpha-dimethylbenzylazomethine, triphenylmethlazomethine or alpha, alpha-diphenylbenzylazomethine, tribenzylmethylazomethine, tri(2-phenylethyl) methylazomethine.

Still another type of methylene donor is trimeric methyleneaminoacetonitrile made by reacting sodium cyanide and formaldehyde in the presence of ammonium chloride and which trimer may have the formula (H₂C = NCH₂C ≡ N)₃.

By lower alkyl (1-8C) is meant alkyl radicals such as methyl, ethyl, propyl (n- and iso-), butyl (n-, sec-, iso-, and tert-), amyl (n-, sec-, iso-, and tert-), hexyl, e.g., n-hexyl, sec-hexyl, 2,2-dimethyl-3-butyl, 2,2-dimethyl-4-butyl, 2,3-dimethyl-2-butyl, 2-methylpentyl, 2-methyl-2-pentyl, 3-methyl-1-pentyl, 3-methyl-2-pentyl, etc., heptyl, e.g., n-heptyl, sec-heptyl, 2,3 -dimethyl-3-pentyl, 2,4-dimethyl-2-pentyl, 2,4-dimethyl-3-pentyl, 2,2,3-trimethyl-3-butyl, 3-ethyl-2-pentyl, 2-methyl-2-hexyl, etc., oxtyl, e.g., n-octyl, 2-ethyl-hexyl and 2,2,4,4-tetramethylbutyl.

Each of the methylene donors described above will react to form a resin in situ in the rubber when reacted with any one or combination of the following methylene acceptors; resorcinol, urea, m-aminophenol, resorcinol monoacetate, resorcinol diacetate, and other m-disubstituted benzenes wherein the substituents may be hydroxyl (-OH), amino (-NH₂) or acetoxy (OCOCH₃) radicals; as well as 1,5 naphthalenediol, phenol, melamine, alpha and beta naphthol resins resulting from the partial reaction of the foregoing acceptors with formaldehyde. Other acceptors include the partial reaction products of melamine and phenols such as resorcinol, and m-aminophenol, with urea, aniline and m-phenylenediamine.

The combination of a methylene acceptor and a methylene donor capable of generating methylene groups is believed to react to form a resin in situ within the rubbery blend under heating during the vulcanization step.

The methylene acceptor and donor may also be added in the form of a complex of the donor and acceptor, for example, a complex of resorcinol and hexamethylenetetramine "("The structure of the Product of Interaction of Resorcinol and Hexamethylenetetramine Potabso et al., Kauchuk Rezina 12, 19-21, Dec. 1965.). Normally, however, it is more economical to add the methylene donor and methylene acceptor separately rather than adding the donor/acceptor complex to the tread composition.

The methylene donor and methylene acceptor can be compounded with the rubbery blend in combination or individually and in any order. They can both be added to any of the components of the rubbery blend before blending or to the blend itself.

The amount of methylene donor may vary from about 0.5 to about 5.0 parts by weight per 100 parts by weight of the elastomeric portion of the tread composition. The methylene acceptor portion of the in situ resin systems may be from about 0.5 to about 5.0 parts by weight per 100 parts by weight of the elastomeric portion of the tread composition. The complex of methylene donor/acceptor may be used from 1.0 to about 10.0 parts by weight per 100 parts by weight of the elastomeric portion of the tread composition. Preferably the methylene acceptor and methylene donor are used in approximately stoichiometric amounts. When they are not used in stoichiometric amounts it is preferred that a stoichiometric excess of the methylene acceptor be used.

The elastomeric butadiene/styrene copolymers (SBR) to be used within the practice of the present invention normally possess a bound butadiene content of 50 percent or higher. They are generally prepared by well-known emulsion, free radical polymerization techniques. Preferred as tread stocks are those polymers prepared using what is commonly referred to as a "cold recipe." Oil extended polymers may be used as well as SBR polymers containing no extending oil.

The natural rubber to be used within the practice of the present invention is the type normally used in tire tread stocks, e.g., natural rubber possessing a high cis-1,4 content, such as pale crepe. Synthetic high cis-1,4, i.e., in excess of 90 percent, polyisoprene may be used interchangeably with natural rubber within the practice of the present invention. These synthetic polyisoprenes are prepared by a number of well-known methods, e.g., by solution polymerization of isoprene-1,3, in the presence or organometallic catalysts.

The cis-1,4 polybutadiene polymers to be used in the practice of the present invention are those cis-1,4 polybutadiene polymers possessing approximately 35 percent and more cis-1,4 conformation. These polymers may be prepared by various well-known methods. Polymers possessing approximately 35 percent to approximately 50 percent cis-1,4 conformation, for example, can be produced by solution polymerization of butadiene-1,3 in the presence of certain lithium based catalyst systems. Such polymers normally contain 15 percent and less 1,2 conformation. Polybutadiene polymers containing in excess of 35 percent cis-1,4 conformation can be prepared, for example, by the solution polymerization of butadiene-1,3 in the presence of organometallic coordination catalyst systems wherein the catalyst systems contain compounds of aluminum, titanium, nickel, cobalt and/or other metals in combinations known to those skilled in the art.

The rubbery composition used within the practice of the present invention contain at least one rubbery polymer selected from the group consisting of:
 a. cis-1,4 polybutadienes
 b. elastomeric butadiene/styrene copolymers
 c. natural rubber
 d. cis-1,4 polyisoprenes That is, the above rubbery polymers may be used alone or in combination with each other.

It has been discovered that rubbery blends containing (A) from about 10 to about 90 parts by weight of at least one polymer selected from the group consisting of natural rubber and a synthetic polyisoprene rubber possessing a cis-1,4 content in excess of 90 percent and (B) from about 90 to about 10 parts by weight of at least one cis-1,4 polybutadiene rubber possessing a cis content in excess of 35 percent wherein the sum of (A) plus (B) is 100 parts by weight, are particularly desirable. Preferably the ratio of (A) to (B) is from about 75 to 25 parts/25 to 75 parts where (A) plus (B) is 100 parts by weight. Most preferably the ratio of (A) to (B) is from about 60 to 40/40 to 60 where (A) plus (B) is 100 parts by weight.

Another rubbery blend within the practice of the present invention which is particularly desirable is a blend containing:
 a. from about 10 to about 30 parts by weight of at least one polymer selected from the group consisting of natural rubber and a synthetic polyisoprene rubber possessing a cis-1,4 content in excess of 90 percent,
 b. from about 10 to about 30 parts by weight of at least one elastomeric butadiene/styrene copolymer and
 c. from about 40 to about 60 parts by weight of at least one cis-1,4 polybutadiene rubber possessing a cis content in excess of 35 percent wherein the sum of (a) plus (b) plus (c) is 100 parts by weight.

The tread compositions of the present invention may contain other elastomeric polymers in addition to the natural rubber, synthetic polyisoprene, elastomeric butadiene/styrene copolymers and cis-1,4 polybutadiene. Such polymers include elastomeric terpolymers (EPDM) of ethylene, propylene and an unconjugated diene. However, as the blend of the present invention is diluted with other elastomeric polymers the properties of the tread composition will be altered accordingly. It is preferred that tread compositions of the present invention contain, as their major elastomeric component cis-1,4 polybutadiene, elastomeric butadiene/styrene copolymer, natural rubber and cis-1,4 polyisoprene and combinations thereof. Particularly preferred are tread compositions where the elastomeric portion of the tread composition consists essentially of at least one of these polymers.

By a low or reduced level of sulfur is meant sulfur used in amounts between about 0.5 and about 1.5 parts by weight per 100 parts by weight of the elastomeric portion of the rubbery blend. Preferably the amount of sulfur is from about 0.5 to about 1.0 part by weight. Any of the common vulcanization aids such as accelerators, zinc oxide, and stearic acid, and the like may be and preferably are used along with the sulfur.

The tread composition may be mixed in any conventional manner, e.g., on an open mill or in an internal mixer. Preferably the donor and acceptor are not mixed together at high temperatures. For example, where a two-step, productive/nonproductive, mixing procedure is used, preferably the donor and acceptor are not mixed together in the first step, i.e., nonproductive mixing step. If a donor/acceptor complex is used, it is added preferably in the second mixing step.

The following examples are intended to be illustrative but not limiting as to the practice of the present invention.

EXAMPLES 1 to 5

Tread stock compositions, examples 1, 2, 3, 4 and 5 are prepared as shown in table I. Examples 1, 2 and 3 are tread stock compositions outside the scope of the present invention, while examples 4 and 5 are tread stock compositions within the scope of the present invention. The compositions are mixed in a Banbury internal mixer in two stages, the components from natural rubber to, and including, resorcinol being added in the first stage, and the remaining components being added in the second stage.

TABLE I

| Components (parts by weight) | Examples | | | | |
|---|---|---|---|---|---|
| | 1 | 2 | 3 | 4 | 5 |
| Natural rubber | 100.0 | 50.0 | 50.0 | 50.0 | 50.0 |
| Cis-1,4 polybutadiene [1] | | 50.0 | 50.0 | 50.0 | 50.0 |
| Carbon black (LM-ISAF) | 44.0 | | | | |
| Carbon black (ISAF) | | 44.0 | 44.0 | 44.0 | 44.0 |
| Pine tar | 4.25 | | | | |
| Naphthenic extending oil | | 8.0 | 8.0 | 8.0 | 8.0 |
| Wax | 1.00 | 1.00 | 1.00 | 1.00 | 1.00 |
| Antioxidant | 2.00 | 2.00 | 2.00 | 2.00 | 2.00 |
| Stearic acid | 3.00 | 2.00 | 2.00 | 2.00 | 2.00 |
| Resorcinol | | | | 0.80 | 0.80 |
| Hexamethylene tetramine | | | | 1.45 | 1.45 |
| (90/10) N-oxydiethylene-2-benzothiazyl sulfenamide/benzothiazyl disulfide | 0.50 | 1.50 | 1.50 | 1.00 | 1.00 |
| Zinc oxide | 5.00 | 5.00 | 5.00 | 5.00 | 5.00 |
| Sulfur | 2.50 | 1.60 | 1.00 | 1.00 | 1.25 |

[1] Polymer containing approximately 93% cis-1,4 configuration. All of the cis-1,4 polymers in the remaining examples herein are of the same type.

The above tread stock compositions are tested in the laboratory for various physical properties which are listed below in table II.

It should be noted in interpreting the physical properties of the tread compositions tested in the following examples than an increase in dynamic modulus and an increase in abrasion resistance is indicative of improved tread wear, while a decrease in hot elongation before and/or after air bomb aging and an increase in heat rise is indicative of poorer chip resistance, tread cracking resistance and rib tear resistance.

TABLE II

| Physical properties | Examples | | | | |
|---|---|---|---|---|---|
| | 1 | 2 | 3 | 4 | 5 |
| Ring abrasion: [2] | | | | | |
| 23/300 [3] | 5.27 | 0.39 | 0.47 | 0.59 | 0.58 |
| 46/300 | 6.02 | 0.53 | 0.58 | 0.65 | 0.63 |
| Dynamic modulus: [4] | | | | | |
| 18/300 | 65.4 | 73.5 | 70.4 | 78.9 | 77.8 |
| 36/300 | 67.1 | 73.5 | 66.0 | 73.9 | 80.5 |
| Heat rise under constant force: [5] | | | | | |
| 18/300 | 81 | 66 | 80 | 80 | 73 |
| 36/300 | 80 | 68 | 95 | 80 | 68 |
| Hot elongation: [6] | | | | | |
| 18/300 | 715 | 460 | 575 | 580 | 525 |
| 36/300 | 670 | 435 | 530 | 585 | 540 |
| Hot elongation after 7 hours air bomb aging: [6][7] | | | | | |
| 18/300 | 625 | 360 | 450 | 500 | 460 |
| 36/300 | 525 | 375 | 490 | 525 | 430 |

[2] Baird and Svellic, India Rubber World 127 363 (1952).
[3] Vulcanized for 28 minutes at 300° F.
[4] ASTM-D623—Method C.
[5] ASTM-D623—Method A.
[6] ASTM-D412-62T—Part (J).
[7] ASTM-D454.

The above data demonstrate several facts. They show that the addition of cis-1,4 polybutadiene to natural rubber requires the use of lower levels of sulfur in order to obtain reasonable hot elongation properties. By reducing the sulfur level from 1.60 parts (example 2) to 1.0 parts (example 3) the hot elongation, both before and after air bomb aging, is increased. However, the heat rise under constant force is increased and the dynamic modulus is decreased. The data in examples 4 and 5 show that the addition of the acceptor and donor to form a resin in situ increases the dynamic modulus and decreases the heat rise and at the same time increases the hot elongation before air bomb aging and maintains the hot elongation after air bomb aging.

Tires may be tested in various ways to determine hot rib tear resistance, chipping resistance and tread cracking resistance. In the hot rib tear test the tire to be tested is mounted on a wheel, inflated to its proper inflation and heated to 250° F. in an oven. The tire is positioned on a truck containing a full load. The tire is then run up a small incline to rest on the top of a concrete curb while the tire is still hot. The curb approximates the type of curb found on a normal street, is 6 inches high and approximately 1 foot wide. The test comprises running the tire off the edge of the curb, allowing the tire to drop off the curb in such a way so that the outside rib of the tire is bent back, causing excessive strain upon the rib. The amount of damage done to the rib, such as pieces of rubber being chunked or torn out of the rib, or tears at the bottom of the groove adjacent to the rib, are measured and a rating is applied to the amount of damage done. This rating is an empirical rating tabulated on the basis of the inches of tearing, cracking and/or shattering that occurs to the tire and is assigned values ranging from excellent to good to fair to poor. The above is descriptive of the original tire test. The residual rib tear test is the same as the original tire test, with the exception that the tire has been run over the road on a truck at the proper inflation and rated load for 16,000 miles before testing. The rib tire test is then repeated in the same manner as the original tire test.

In the chipping resistance test the tire is first subjected to a certain period of operation over a standard paved road. It is then placed on a gravel course and run for a specified mileage over the gravel. Ratings are applied based upon the appearance of the tread rechipping or flaking when compared with the control tire. These ratings vary from excellent to good, to fair to poor.

Tread cracking resistance is normally measured by determining the number of cracks and the size of the cracks within the grooves of a tire tread after the tire has been subjected to service over a pavement for a given period of time.

EXAMPLES 6 to 8

In the following examples 6 to 8 the tread stock compositions described in table I (examples 1, 4 and 5 respectively) are tested in 10.00×20 rib type tread truck tires of bias construction. These tires are run for 16,000 miles and residual hot rib tear evaluations made thereafter. Original hot rib tear observations, as mentioned earlier herein, are made prior to the 16,000-mile run. The results are listed in table III below.

TABLE III

| Ex. | Elastomeric portion of the tread composition | Compounding | Hot rib tear resistance | |
|---|---|---|---|---|
| | | | Residual | Original |
| 6 | Natural rubber | 2.5 parts sulfur | Fair-minus | Fair-minus |
| 7 | 50/50 natural rubber/cis-1,4 polybutadiene | Resin plus 1.0 part sulfur | Fair | Fair |
| 8 | do | Resin plus 1.25 parts sulfur | Poor | Fair-minus |

As the data above indicate, the blend cured using 1.0 part of sulfur is superior to the natural rubber tread in hot rib tear resistance. The comparison of examples 7 and 8 also indicates the criticality of the sulfur level to be used in the blend-resin combinations. Although 1.25 parts of sulfur offers rib tear resistance superior to compositions using conventional levels of sulfur, e.g., 2.5 parts of sulfur, 1.0 part of sulfur offers even greater protection. Hence levels even lower than 1.25 parts of sulfur are preferred where improved hot rib tear resistance is desired for a natural rubber/cis-1,4 polybutadiene blend.

Examples 9, 10 and 11

The tread wear ratings on the tires in Examples 6, 7 and 8 are listed below in Table IV.

TABLE IV

| Example | Elastomeric portion of the tread composition | Compounding | Tread wear at 16,000 miles |
|---|---|---|---|
| 9 | Natural rubber | 2.5 parts sulfur | 100 |
| 10 | 50/50 natural rubber/cis-1,4 polybutadiene | Resin plus 1.0 part sulfur | 111 |
| 11 | do | Resin plus 1.25 parts sulfur | 133 |

As the above data indicate, tread compositions of the present invention in examples 10 and 11 possess tread wear properties superior to that of natural rubber. Therefore, in combining the results listed in table III and those in table IV it is observed that the tread compositions of the present invention in these examples not only possess favorable rib tear resistance comparable with that of natural rubber, but in addition, possess tread wear resistance superior to that of natural rubber.

EXAMPLES 12 and 13

In the following examples 12 and 13 the tread stock compositions described in table I, examples 1 and 4 respectively, are tested in 10.00×20, rib-type tread, truck tires of radial and steel cord construction. The treads are of the three-way type. That is, one third of tread possesses a tread composition according to example 4.

The test tire results are shown in table V.

TABLE V

| Example | Tread composition | Compounding | Tread wear rating | Chip resistance |
|---|---|---|---|---|
| 12 | Natural rubber | 2.5 parts sulfur | 100 | Fair. |
| 13 | 50/50 natural rubber/cis-1,4 polybutadiene | Resin plus 1.0 part sulfur | 103 | Good-plus. |

The above data shows that a tread composition of the present invention (example 11) on comparing with a natural rubber tread composition (example 10) possesses equal to superior tread wear and superior chip resistance.

EXAMPLES 14 and 15

In the following examples 14 and 15 tread stock compositions are tested in tires of the same construction as described in examples 12 and 13 with the exception that the tires of examples 14 and 15 are one way tires. That is, each tread composition is tested on a different tire where the entire tread composition of the tire is the same. The tread composition in example 15 is the same as that described in example 4. The tread composition in example 14 is mixed in a Banbury mixer and is described below.

| Components | Parts by weight |
|---|---|
| Natural rubber | 100.00 |
| Carbon black (LS-ISAF) | 50.00 |
| Pine tar | 7.00 |
| Wax | 1.00 |
| Antioxidant | 2.00 |
| Stearic acid | 3.00 |
| (90/10) N-oxydiethylene-2-benzothiazyl sulfenamide/ benzothiazyl disulfide | 0.50 |
| Zinc oxide | 5.00 |
| Sulfur | 2.50 |

Test results are listed below in Table VI.

TABLE VI

| Example | Tread Composition | Compounding | Tread wear rating | Chip resistance |
|---|---|---|---|---|
| 14 | Natural rubber | 2.5 parts sulfur | 100 | Good-plus. |
| 15 | 50/50 natural rubber/cis-1,4 polybutadiene. | Resin plus 1.0 part sulfur. | 132 | Do. |

The above data indicate that a tire containing a tread composition within the practice of the present invention (example 15) produces chip resistance equivalent to a natural rubber tread composition (example 14) and in addition, possesses superior tread wear.

EXAMPLES 16, 17 and 18

The following examples compare a 50/50 natural rubber/cis-1,4 polybutadiene blend using a high-sulfur vulcanization system and no resin (example 16), the same blend containing an in situ resorcinol/hexamethylenetetramine resin and a reduced sulfur vulcanization system (example 17) and the same blend containing an in situ urea/hexamethylenetetramine resin and a reduced sulfur vulcanization system (example 18). In interpreting the significance of the Instron tear data after nitrogen bomb aging it should be noted that an increase in Instron tear is indicative of better rib tear resistance. The composition of example 17 is the same as that described in example 4. The compositions of example 16 and example 18 are the same as that of example 17 with the exceptions that example 16 contains no resin and contains 2.50 parts of sulfur and in example 18 urea is substituted for resorcinol. Physical properties on these various tread compositions, examples 17 and 18 being representative of tread compositions of the present invention, are shown in table VII.

TABLE VII

| Physical properties | Example 16 a | Example 17 b | Example 18 c |
|---|---|---|---|
| 300%: | | | |
| Modulus [5] | 1,575 | 1,180 | 1,400 |
| Tensile [9] | 3,050 | 3,150 | 3,700 |
| Elongation Percent [6] | 470 | 640 | 560 |
| Hot tensile [7] | 2,030 | 2,350 | 1,955 |
| Hot elongation [8] | 450 | 630 | 475 |
| Dynamic modulus [4] | 85.4 | 97.4 | 84.3 |
| Dynamic resilience [10] | 50.6 | 43.7 | 47.4 |
| Heat rise at constant force [4] | 66 | 66 | 72 |
| Aged 7 hours in a nitrogen bomb at 250° F.[10]: | | | |
| Hot tensile [9] | 1,335 | 2,100 | 1,670 |
| Hot elongation [8] | 315 | 525 | 395 |
| Instron tear [12] | 300 | 980 | 730 |

[4] ASTM-623 Method C.
[5] ASTM-D623—Method A.
[6] ASTM-D412-62T—Part (J).
[8] ASTM-D412-62T.
[9] ASTM-D412-62T—Part (J).
[10] ASTM-D623—Method C.
[11] ASTM-D454, except that it is run in a nitrogen atmosphere at 250° F.
[12] ASTM-D624.

a No resin, high sulfur system.
b Resorcinol/hexamethylene tetramine in situ resin, reduced sulfur system.
c Urea/hexamethylene tetramine in situ resin, reduced sulfur system.

The above data demonstrate that the use of a donor and acceptor to form a resin in situ together with a reduced sulfur system in (examples 17 and 18) a natural rubber/cis-1,4 polybutadiene blend improves the hot elongation and Instron tear properties of the blends. Such data indicate that the use of compounds of examples 17 and 18 in tread compositions provides improved rib tear resistance, tread cracking resistance and chip resistance. In addition, the other properties of the polymers are equivalent to or superior to the blend containing no resin and using a high sulfur system.

EXAMPLES 19 and 20

In the following examples 19 and 20 natural rubber tread compositions are tested in a 10:00×20 truck tire of bias construction as part of a three way tread construction. The tread composition of example 19 is the same as described in example 5. The tread composition of example 20 is identical to that of example 19 with the exception that it contains a reduced level of 1.25 parts of sulfur and is compounded with 0.80 part of resorcinol and 1.45 parts of hexamethylenetetramine. Tread wear and rib tear measurements are made at 15,000 miles. The results are listed in table VIII.

TABLE VIII

| Ex. | Elastomeric portion of the tread composition | Compounding | Tread wear | Hot rib tear resistance |
|---|---|---|---|---|
| 19 | Natural rubber | 2.5 parts sulfur | 100 | Good. |
| 20 | do | Resin plus 1.25 parts sulfur. | 115 | Very, very good. |

The above data show an increase in tread wear and rib tear resistance by the reduction of the sulfur level and the presence of an in situ resin.

EXAMPLES 21 and 22

In the following examples 21 and 22 a 50/50 natural rubber/cis-1,4 polybutadiene tread composition containing 1.00 part of sulfur and an in situ resin is compared with a 25/50/25 SBR/cis-1,4 polybutadiene/natural rubber tread composition which contains 1.00 part of sulfur and is compounded with 0.80 part of resorcinol and 1.45 parts of hexamethylenetetramine, as part of a three-way tread construction. The tread compositions are tested in a 10:00×20 truck tire of bias construction. The compositions are compounded in the same manner as that described in examples 1 to 5 except that the carbon black and oil levels are 54 parts and 11 parts respectively. In essence, the tread composition of example 22 is identical with that of example 21 with the exception that in example 22 a portion of the natural rubber component in the example 21 blend is replaced with an elastomeric butadiene/styrene copolymer (SBR). The SBR polymer possesses a bound styrene content of about 23 percent and is prepared by emulsion polymerization using a "cold recipe." Tread wear and rib tear measurements are made at 15,000 miles. The results are listed in table IX.

TABLE IX

| Ex. | Elastomeric portion of the tread composition | Compounding | Tread wear | Hot rib tear resistance |
|---|---|---|---|---|
| 21 | 50/50 natural rubber/cis-1,4 polybutadiene. | Resin plus 1.00 part sulfur. | 100 | Fair-minus. |
| 22 | 25/25/50 SBR/natural rubber/cis-1,4 polybutadiene. | Resin plus 1.00 part sulfur. | 111 | Do. |

The above data show that the replacement of a portion of the natural rubber with SBR results in improved tread wear without a reduction in hot rib tear resistance.

EXAMPLES 23 and 24

In the following examples 23 and 24 a (68.75/50) oil extended SBR/cis-1,4 polybutadiene tread composition is tested in a 10.00×20 truck tire of bias construction. The treads are of one way construction. Each composition contains a reduced sulfur level but the composition of example 24 contains an in situ resin.

| Components (parts by weight) | Examples | |
|---|---|---|
| | 23 | 24 |
| Oil extended SBR [13] | 68.75 | 68.75 |
| Cis-1,4 polybutadiene | 50.0 | 50.0 |
| Precipitated silicon dioxide (HiSil) | 5.0 | 5.0 |
| Carbon black (ISAF) | 65.0 | 65.0 |
| Processing oil | 15.0 | 15.0 |
| Wax | 2.50 | 2.50 |
| Antioxidant | 1.50 | 1.50 |
| Stearic acid | 1.00 | 1.00 |
| Resorcinol | | 0.80 |
| Hexamethylenetetramine | | 1.45 |
| (90/10) N-oxydiethylene-2-benzothiazyl sulfenamide/benzothiazyl disulfide | 1.50 | 1.25 |
| Zinc oxide | 3.00 | 3.00 |
| Sulfur | 1.25 | 1.25 |

[13] The oil extended SBR contains a base polymer made using an emulsion polymerization system and a "cold recipe." The oil level is 37.5 parts.

Tread wear measurements are made at 15,000 miles. Rib tear measurements are made at 15,000 and 33,000 miles. The results are listed in table X.

TABLE X

| Example | Elastomeric portion of the tread composition | Compounding | Tread wear | Hot rib tear resistance | |
|---|---|---|---|---|---|
| | | | | 15,000 miles | 33,000 miles |
| 23 | (68.75/50) oil extended SBR/cis-1,4 polybutadiene. | 1.25 parts sulfur | 100 | Very good | Fair. |
| 24 | do | Resin plus 1.25 parts sulfur | 102 | Very good-plus | Very good. |

As shown by the above data the combination of in situ resin and reduced sulfur (example 24) improves the rib tear resistance of an SBR/cis-1,4 polybutadiene tread composition.

The present invention provides the art with a tread composition which possesses improved resistance to rib tearing, chipping and tread cracking and/or improved tread wear. In some of its embodiments the present invention provides a tread composition which possesses tread wear equal to or superior to natural rubber and/or which possesses resistance to chipping, resistance to rib tearing and resistance to tread cracking which is similar to or superior to that of natural rubber and/or cis-1,4 polyisoprene.

While certain representative embodiments and details have been shown for the purpose of illustrating the invention it will be apparent to those skilled in this art that various changes and modifications may be made therein without departing from the spirit or scope of the invention.

What I claim is:

1. In a pneumatic tire having a tread portion the improvement wherein the tread is made of a carbon black reinforced vulcanizable tread composition comprising (A) 100 parts of at least one rubbery polymer selected from the group consisting of (a) cis-1,4 polybutadienes, (b) elastomeric butadiene/styrene copolymers, (c) natural rubber and (d) synthetic cis-1,4 polyisoprenes; (B) from about 0.5 to about 5.0 parts of methylene donor, (C) from about 0.5 to about 5.0 parts of a methylene acceptor, wherein (B) and (C) are in free or complex form, and are capable of reacting with each other to form an in-situ resin, and (D) from about 0.5 to about 1.5 parts by weight of sulfur, all parts being by weight and per 100 parts of the rubbery polymer, wherein the methylene donor is selected from the group consisting of A. hexamethylenetetramine and complexes of hexamethylenetetramine;

B. N-(substituted oxymethyl) derivatives of urea selected from the group consisting of a. N-(substituted oxymethyl) imidazolidines,
b. N-(substituted oxymethyl) hydantoins, and
c. derivatives of urea having the following structural formula

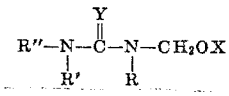

wherein Y is selected from the group consisting of oxygen and sulfur, X is selected from the group consisting of hydrogen and lower alkyl radicals having one to eight carbon atoms and R, R' and R" are selected from the group consisting of hydrogen, lower alkyl radicals having one to eight carbon atoms and —CH$_2$OH with the provisos that the compound contains less than three —CH$_2$OX groups and that each nitrogen atom contains less than two —CH$_2$OX groups;

C. N-(substituted oxymethyl) melamine derivatives;
D. N-(substituted oxymethyl) carboxylic acid amides;
E. an N-(substituted oxymethyl) cyclicimide;
F. a 5-substituted-1-aza-3,7-dioxabicyclo [3.3.0] octane;
G. a 5-substituted-1,3-di (substituted oxymethyl)hexahydrotriazin-2-one;
H. trimeric methyleneamino acetonitrile, and
I. an azomethine of the general formula

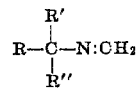

wherein R, R' and R" are lower alkyl (1–8C) radicals and wherein the methylene acceptor is selected from the group consisting of urea and m-disubstituted benzenes wherein the substituents are selected from the group consisting of hydroxyl, amino and acetoxy radicals.

2. The vulcanizable tread composition according to claim 1 wherein the sulfur level is from about 0.5 to about 1.0 part by weight per 100 parts by weight of rubbery polymer.

3. The vulcanizable tread composition according to claim 1 wherein the molar ratio of the methylene acceptor to the methylene donor is at least equal to the stoichiometric ratio of the methylene acceptor to the methylene donor.

4. The tread composition of claim 1 wherein the pneumatic tire is a truck tire.

5. The tread composition according to claim 1 wherein the tire is an off the road tire.

6. The vulcanizable tread composition of claim 1 wherein the methylene donor is selected from the group consisting of hexamethylenetetramine and complexes of hexamethylenetetramine and wherein the methylene acceptor is resorcinol.

7. The vulcanizable tread composition of claim 1 wherein the methylene donor is a toluene sulfonic acid complex of hexamethylenetetramine.

8. The tread composition according to claim 1 wherein the rubbery polymer is comprised of from about 10 to about 90 parts of at least one polymer selected from the group consisting of natural rubber and a synthetic polyisoprene rubber possessing a cis-1,4 conformation in excess of about 90 percent and from about 90 to about 10 parts of at least one cis-1,4 polybutadiene rubber possessing a cis conformation in excess of about 35 percent.

9. The tread composition according to claim 1 wherein the rubbery polymer is comprised of from about 10 to about 30 parts by weight of at least one polymer selected from the group consisting of natural rubber and a synthetic polyisoprene rubber possessing a cis-1,4 content in excess of 90 percent, from about 10 to about 30 parts by weight of at least one elastomeric butadiene/styrene copolymer rubber and from about 40 to about 60 parts by weight of at least one cis-1,4 polybutadiene rubber possessing a cis conformation in excess of 35 percent.

10. A vulcanized pneumatic tire prepared by vulcanizing the pneumatic tire of claim 1.

* * * * *